Figure 6:
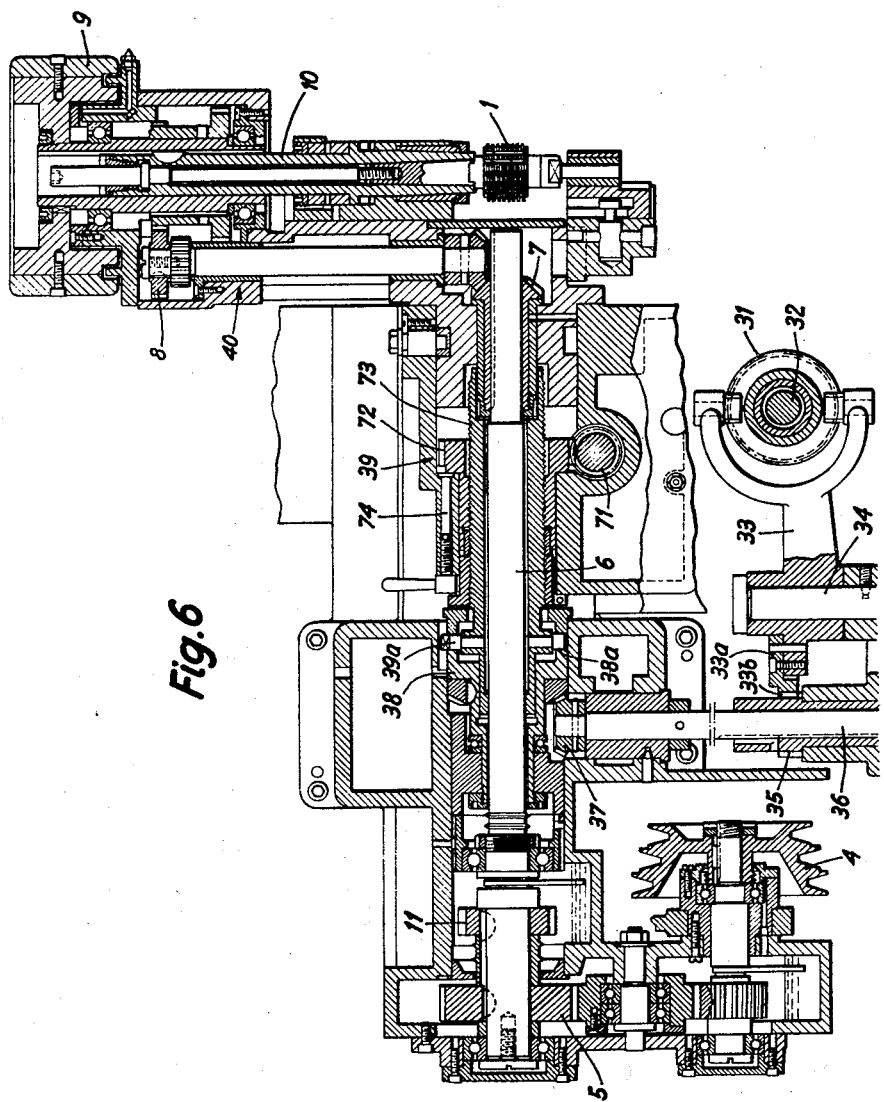

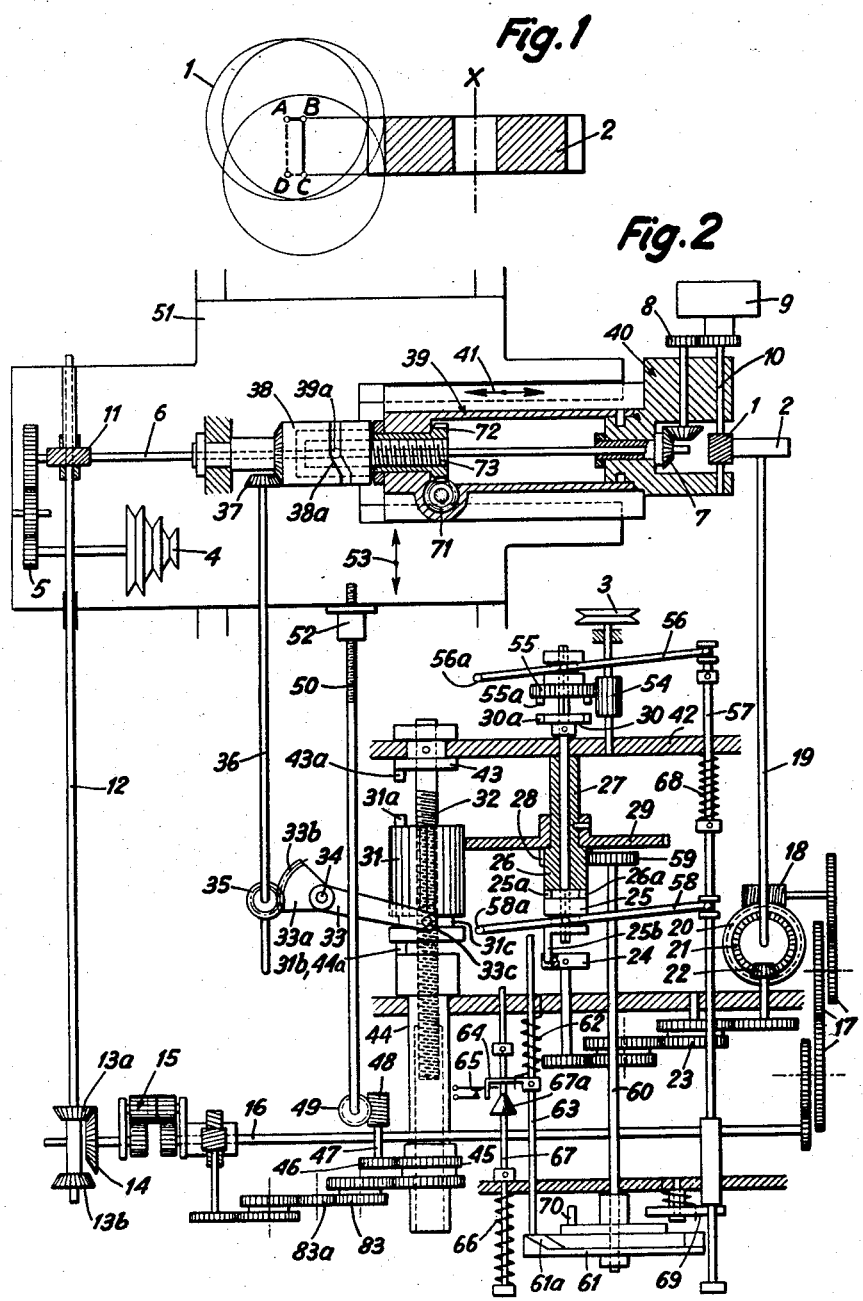

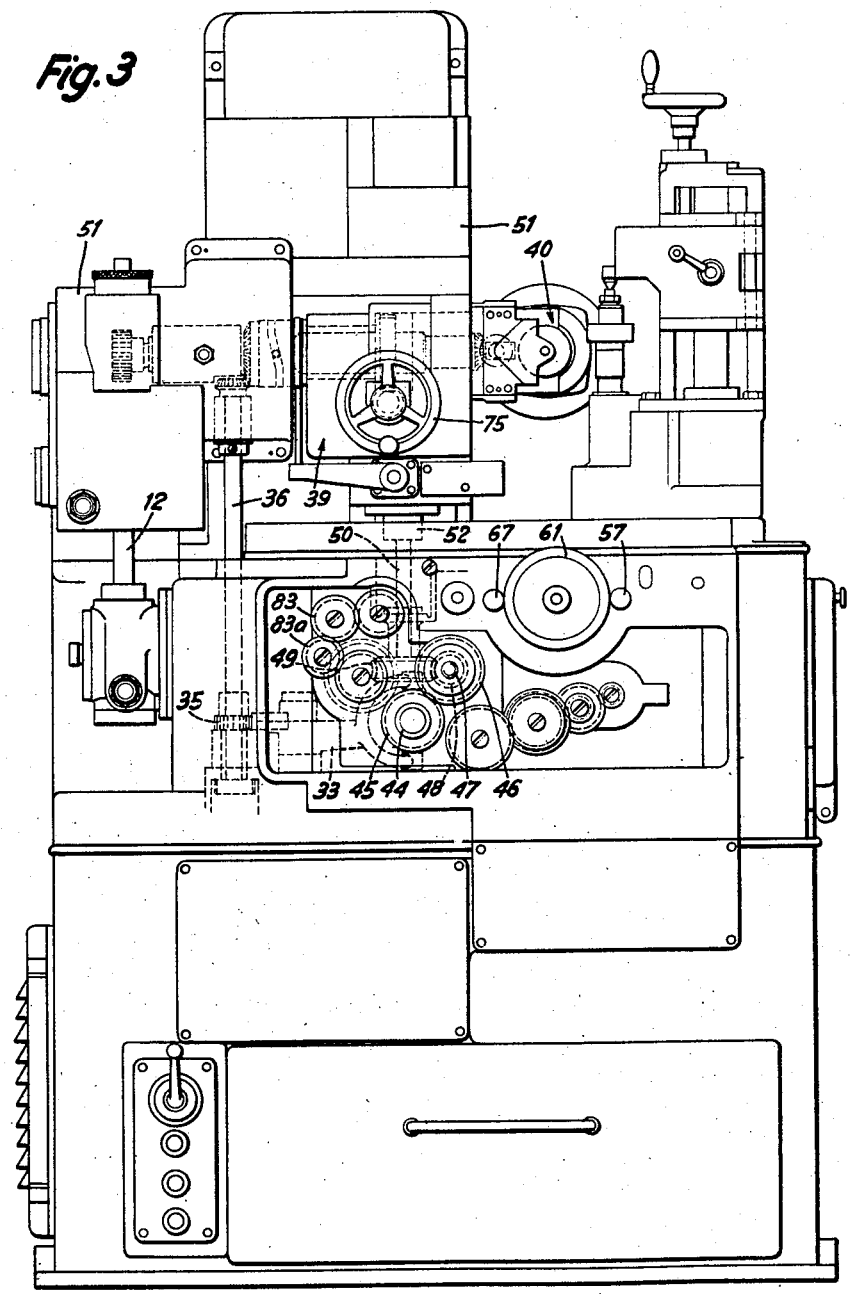

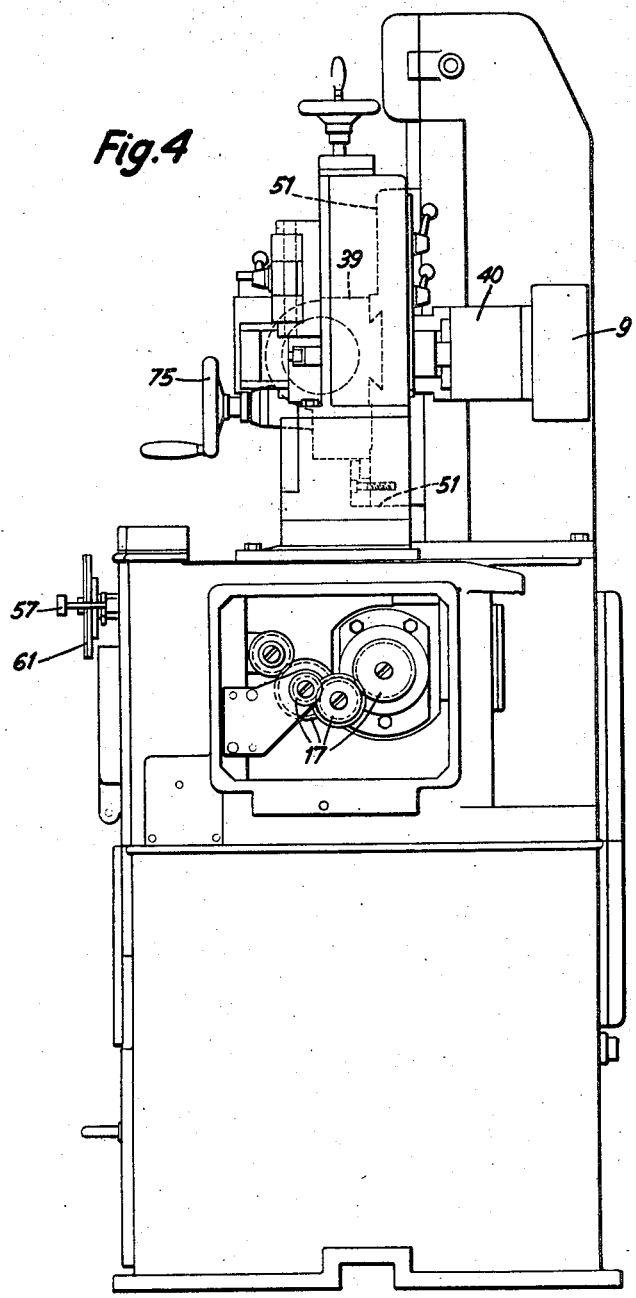

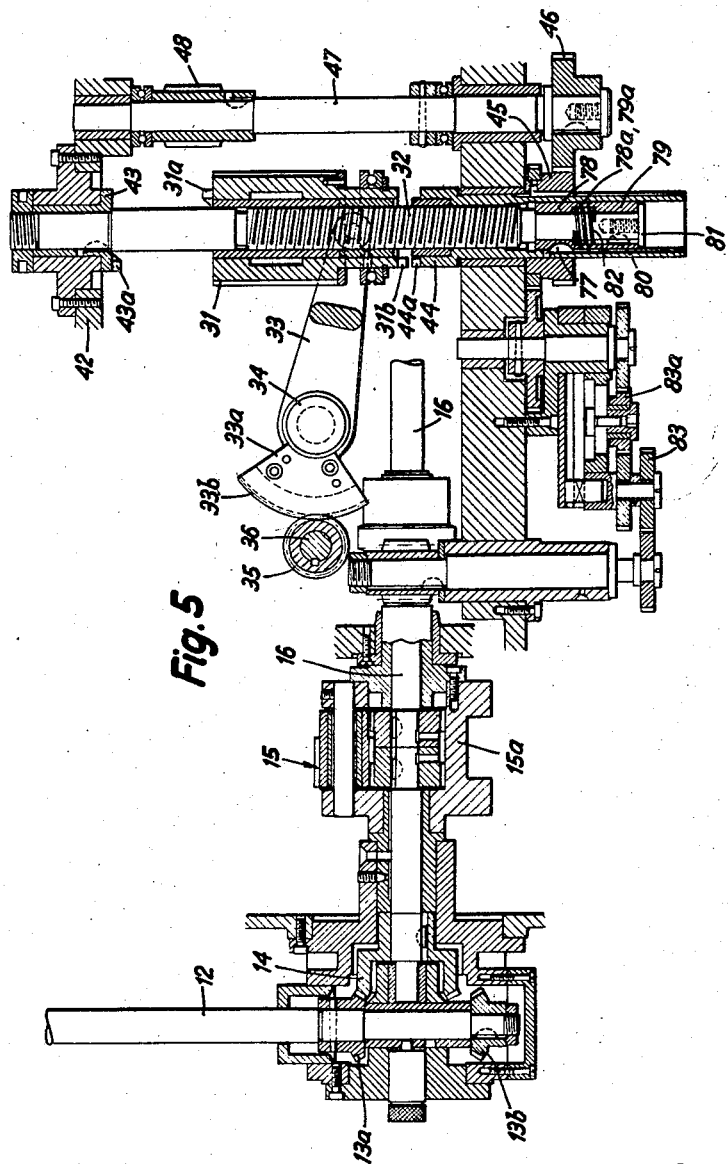

United States Patent Office 2,891,450
Patented June 23, 1959

2,891,450

GEAR HOBBING MACHINE

Ernst Freudiger, Biel, Switzerland, assignor to S. Lambert A.G., Grenchen, Switzerland Application March 15, 1955, Serial No. 494,436

Claims priority, application Switzerland September 10, 1954

14 Claims. (Cl. 90—4)

The present invention relates to improvements in gear hobbing machines which are in particular adapted for the production of spur gears, helical or spiral gears and worm gears. Machines of this kind are known in the art, in which the tool first performs a radial movement with respect to the work, and then an axial movement. Machines of this character are described, for example, in the Swiss Patents Nos. 153,893, 177,661 and 223,363.

To cause the tool to move radially and then axially with respect to the work, plate cams have been used so far, which, however, only are suited for the production of relatively small spur gears.

The present invention discloses a different solution and relates to a gear hobbing machine of the type described and characterized by a threaded spindle on which is mounted a nut which is non-positively connectable with the drive for the purpose of generating said two movements.

The machine according to the present invention has an important advantage in that it may be used, when appropriately designed, not only for the production of spur gears but also of helical or spiral gears, the tool in such latter case undergoing first an axial and then a radial movement. Common non-beveled milling-cutters, as employed for the production of spur gears, then also may be used for the production of helical or spiral gears.

One form of the machine according to the present invention is shown in the accompanying drawings, in which:

Fig. 1 schematically shows the movements of the cutter relatively to the work,

Fig. 2 is a schematical representation of all the machine parts essential for the operation, Fig. 3 is a front elevation of the machine, the gearing cover being open, Fig. 4 is a side view of the machine, from the right, Fig. 5 shows the spindle, the spindle nut as well as further elements co-acting therewith, and Fig. 6 is a section through the slide carrying the machine, and through the latter itself.

As in the case of machines of this type already known, the cutter 1 also in the present machine performs first a radial movement with respect to the work 2 and then an axial movement. Fig. 1 shows the desired sequence of movements.

In the initial position, the tool center is situated at a point A. It first moves radially with respect to the work 2 of which the axis is designated by X—X. For the time being, it is irrelevant that tool and work rotate, and that these rotary movements are in a certain definite relation to each other depending on the type of gear to be milled and on the kind of tool used, but will be described with reference to Fig. 2. After the tool center has reached a point B, i.e. when the infeed or plunge-cut motion has been completed, the cutter is moved in parallel relation with the work axis X—X and, thus, axially with respect to the work until it arrives at a point C. The machining operation now has come to an end, and the cutter shall be moved onward so that its center via a point D regains its initial position A. This return movement desirably is carried out at a higher speed than the machining movement.

Fig. 2 shows schematically the means through which said desired sequence of movements may be attained without using plate cams. Here again, the cutter is designated by 1, and the work by 2. One or two motors (not shown) drive a pulley 3 as well as a pulley set 4. The rotary movement of the latter is transmitted via a transmission 5 on to a drive shaft 6 which via a pair of bevel gears 7 and a pair of spur wheels 8 rotates a tool spindle 10 to which is connected a fly wheel 9. Tool 1 is secured to spindle 10 by known means. Via a cross gearing 11 is driven a shaft 12 which carries two bevel gears 13a and 13b, one of the latter being engaged to a bevel gear 14 which through a differential gearing 15 rotates a shaft 16 and via an index change gear set 17 rotates a worm 18 which meshes with a worm wheel 20 secured to a shaft 19. The latter carries the work holder so that the power transmission described ensures the positive connection of the rotary speeds of cutter and work, as is required for a gear hobbing machine. When it is desired to vary the speed ratio, single gears of the index change gear set 17 may be exchanged.

Worm wheel 20 is integral with a bevel gear 21 which in turn meshes with a bevel gear 22 and thus transmits the rotary movement of the drive motor via feed change gears 23 on to a driving disc 24 and a coupling member 25 connected thereto through a driver 25b in a non-rotatable but axially movable relation. Coupling member 25 is provided with claws 25a which coact with claws 26a of a sleeve 26 so that, in the position shown of coupling member 25, said sleeve and a shaft 27 connected thereto, and gears 28 and 29 keyed thereto, as well as a coupling disc 30 are rotated. Gear 29 meshes with a spindle nut 31 which has straight external teeth and is seated on a journaled threaded spindle 32. Spindle nut 31 is provided with an annular groove 31c in which are engaged two studs 33c of a lever 33, 33a which is adapted as driver and is pivoted at 34. Its arm 33a is provided with a toothed segment 33b which meshes with a gear 35 and, thus, transmits the axial movement of spindle nut 31 via a shaft 36 to which a gear 35 is fixed. A bevel gear 37 is fixed to one extremity of shaft 36 and rotates a sleeve 38. The latter is provided with a circumferential and axially inclined groove 38a in which are engaged guiding pins 39a of a plate 39 which is axially movable but non-rotatable. By reasons of the axial movement of spindle nut 31, said member 39 thus is moved, together with a tool head 40, in the direction of arrows 41, i.e. radially with respect to work 1. Tool head 40 itself is rotatable about shaft 6. For the sake of clearness, the tool head in Fig. 2 is shown in that position in which the axes of cutter and work are parallel to each other, while in Figs. 1, 3 and 4 is shown a possible operating position in which the cutter axis is situated in a plane standing at right angles to the work axis.

The threaded spindle 32 is journaled in a machine-frame portion 42 and comprises a coupling member 43 and 44 respectively on each side of spindle nut 31. Coupling member 43 is rigidly pinned to spindle 32, while coupling member 44 is axially movable on the latter and is locatable thereon in any position. The two coupling members are provided with dogs 43a and 44a respectively, which may coact with drivers 31a and 31b respectively, of spindle nut 31. To coupling member 44 is keyed a gear 45 which meshes with a gear 46 secured to a drive shaft 47 for the axial movement. Shaft 47 carries a worm 48 meshing with a worm wheel 49, through which worm a rotary movement of the spindle nut 31 connected to coupling member 44 may be transmitted on to a lead screw 50 connected to worm wheel 49, said lead screw serving for the axial movement. Lead screw 50 coacts with a nut 52 disposed in a slide 51, so that by the movement of spindle 32 the slide 51 may be moved in the direction of arrows 53, i.e. in parallel relation with the axis X—X of work piece 2. Fig. 6 shows how shaft 36 may be connected to gear 35 in a non-rotatable but axially movable relation. Shaft 12 also is similarly connected to its driving wheels in an axially movable relation.

To pulley 3 is fixed a pinion 54 which meshes with a gear 55 loosely rotatable on shaft 27. Gear 55 is axially movable towards coupling disc 30 by means of an arm 56 until its two driver dogs 55a are engaged in the respective recesses 30a of disc 30. During this axial movement, gear 55, however, always is in engagement with pinion 54. Arm 56 is pivoted at 56a and is controlled by a rod 57 which also controls an arm 58 which is pivoted at 58a and by means of which the coupling member 25 is axially movable.

As shown in Fig. 2, control rod 57 and the coupling elements controlled thereby may assume three different positions. In the position shown, sleeve 26 and, thus, shaft 27 as well as the gears 28, 29 are power-connected to driver disc 24. In the other terminal position, coupling member 25 is freely rotatable, while gear 55 is connected to coupling disc 30, so that shaft 27 and gears 28, 29 are driven by the motor via pulley 3. In the intermediate position, shaft 27 neither is connected to pulley 3 via coupling disc 30 nor to the feed change gears 23 via coupling member 25. Essential for the manner of operation of the machine (described below) is the fact that coupling member 25 and gear 55 are rotatable in opposite directions, and that the rotary speed of the latter is higher than that of the former.

The control mechanism for change-over and disengagement comprises a gear 59 meshing with gear 28 and driving via a shaft 60 a disc 61 provided with a camming face 61a. A torsion and compression spring 62 urges a ram 63 on to face 61a. When ram 63 bears on the topmost point of face 61a, i.e. when spring 62 is compressed most, a yoke 64 mounted pivotably on ram 63 against the action of spring 62, opens an electrical contact 65 to cut out the motor contactors. A pressure rod 67 with a conical part 67a and loaded by a spring 66 extends past yoke 64. Through part 67a the yoke 64 is movable about the axis of ram 63 so that the opened contact 65 is closed again. Control rod 57 is retained in the position shown by means of a spring 68 and a pivotable stop 69. When disc 61 rotates, an adjustable stop 70 connected thereto tilts the pivoted stop 69 so that spring 68 moves rod 57 to the other terminal position in which shaft 27 through pulley 3 is driven in the other direction of rotation, as it is described above.

The machine operates as follows:

In the position shown, the motor (not shown) drives pulley 3 as well as pulley set 4. As described above, cutter and work thereby are rotated at a relative speed ratio which is adjustable by means of the index change gears 17. Through the bevel gears 21 and 22, feed change gears 23, driver disc 24 and coupling member 25 also is driven spindle nut 31 which meshes with gear 29, and this in such direction that nut 31 on spindle 32 is moved towards coupling member 43. Lever 33, 33a connected to spindle 32 through pin 33c thereby is moved through an angle and provokes the above-described movement of cutter head 40 towards axis X—X of work 2, i.e. the required plunge-cut motion from A to B in Fig. 1. As soon as nut 31 has arrived at coupling member 43, i.e. as soon as the dogs 31a and 43a abut against each other, the nut 31 cannot rotate any further with respect to spindle 32. The plunge-cut motion now is completed. However, as gear 29 rotates further, its rotary movement is transmitted, for the axial movement, on to lead screw 50 via spindle nut 31, coupling member 43 and spindle 32, as described above. Consequently, the entire slide 51 with tool head 40 is moved parallel to work axis X—X over the distance B—C of Fig. 1.

After the slide has performed the movement of the desired length, the adjustable stop 70 tilts the pivotable stop 69, whereupon spring 68 urges control rod 57 into the other terminal position. Coupling member 25 thereby is separated from sleeve 26, while gear 55 is connected to coupling disc 30. As described above, gear 55 rotates at a higher speed than coupling member 25 and in the opposite direction. Gear 29 thus also rotates in the opposite sense so that the two dogs 31a and 43a are disengaged from each other, spindle 32 stands still, and spindle nut 31 moves towards coupling member 44. Tool head 40, therefore, executes a movement (the movement C—D of Fig. 1) opposite to the plunge-cut motion. As soon as nut 31 has reached coupling member 44, i.e. as soon as the two dogs 31b and 44a abut against each other, the movement of nut 31 ceases and it engages coupling member 44 so that drive shaft 47 now is rotated via the gears 45 and 46 for the axial movement, and lead screw 50 returns the slide into the initial position (D—A in Fig. 1) for the axial movement. The return movement of the tool head from C into the initial position A thus is carried out at a higher speed than the corresponding movement from A to C for the machining operation.

Together with gear 29, also gear 28, gear 59 meshing with the latter, and disc 61 with camming face 61a has been rotated. When, now, slide 51 has returned into the initial position, disc 61 also has returned into the initial position. The latter is so determined that ram 63 urges arm 58 into the intermediate position, i.e. into that position in which shaft 27 neither is engaged with gear 55 nor with coupling member 25. In this position yoke 64 opens contact 65 so that the motor contactors are cut out.

The work is now in the finished state and may be unclamped. After clamping a fresh work, pressure rod 67 is depressed, whereby yoke 64 is moved angularly by the conical member 67a sliding thereon so that contact 65 closes and tool and work are again driven. By moving control rod 57 against the action of spring 68, coupling member 25 is again coupled to sleeve 26 so that the course of movements just described may be repeated.

In the following is further described how, by means of the present machine, gears of different diameters, different tooth depths, different wheel widths and different lead or pitch may be made.

Member 39 comprises a worm 71 (Fig. 6) which coacts with an internally threaded worm wheel 72 so that it is movable on a sleeve 73 which has corresponding external threads. Together with this worm wheel 72 which may be locked by a device 74, the entire member 39 and tool head 40 is moved radially with respect to the work. When a work shall receive a different diameter than the preceding blank, the operator simply has to set such desired diameter by means of a handwheel 75 (Fig. 3) which is connected to worm 71.

A different cutter has, of course, to be used for each different tooth depth which corresponds to the movement designated by A—B in Fig. 1. When it is desired to change the tooth depth, the distance between the two coupling members 43 and 44 also has to be changed. Coupling member 43 is fixed to spindle 32, while—as shown in Fig. 5—coupling member 44 is movable on spindle 32. Coupling member 44 has internal threads corresponding to the threads of spindle 32 so that it may be moved thereon by rotation. A sleeve 78 which is axially movable with respect to coupling member 44 but is prevented from rotating relatively thereto by a key 77, through its spur-gear element 78 with the spur-gear element 79a of a third sleeve 79. The latter in turn is slidably connected to spindle 32 through a key 80 and is retained in the position shown by a screw 81 against the action of a spring 82. When it is desired to reset coupling member 44, screw 81 is slackened until the two spur-gear elements 78a and 79a are disengaged through spring 82. Coupling member 44 now may be moved and set as desired on the spindle by hand or by means of a wrench through rotation thereof. By tightening screw 81, it may be fixed in any position. The set tooth depth may be conveniently read off from a scale (not shown).

The tooth length which in Fig. 1 is designated by C—B, corresponds to the path covered by slide 51. After the tool has covered the path A—B—C, i.e. when machining of the blank is completed, the change-over mechanism shall be actuated. To this end, the adjustable but lockable stop 70 is connected to disc 61 and may be set so that the swivelable stop 69 is tilted on reaching point C so that shaft 27 is driven in the other direction of rotation and at a higher speed.

In the mode of operation described above, it has been assumed that bevel gear 14 and shaft 16 rotate with the same number of revolutions, i.e. that for example wheel 83a of the differential change gear set 83 does not mesh with one of the adjacent change gears so that housing 15a of differential mechanism 15 may be locked by means of a locking device (not shown). Such mode of operation is used when the work shall be given straight teeth. When it is desired to produce helical or spiral teeth, the work with respect to the cutter has to rotate at a higher or lower speed than for the production of straight teeth of the same modulus. The speed change required therefor is obtained by rotation of housing 15a of the differential mechanism 15. Said housing is driven by coupling member 44 via the variable wheel set 83, the wheel 83a having to be cut in or out according to the desired direction of rotation.

It is to be noted that the rotary movement of housing 15a is produced through spindle 32 in order that it will occur only during the axial movement from B to C (Fig. 1) and not during the radial movement, i.e. during the plunge-cut motion from A to B and withdrawal from C to D.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. In a gear hobbing machine tool, a control arrangement for moving a cutting tool first in radial direction and then in axial direction relative to a cut gear blank, the control arrangement comprising, in combination, first feeding means for feeding the tool in a first direction adapted to be radial with respect to a cut gear; second feeding means for feeding the tool in a second direction adapted to be axial with respect to the cut gear; a turnable first threaded means non-movable in axial direction and operatively connected to said second feeding means for actuating the same during turning movement thereof; a turnable second threaded means threadedly engaging said first threaded means and being movable thereon in axial direction between two control positions during relative turning movement between said first and second threaded means, said second threaded means being operatively connected to said first feeding means for actuating the same by axial movement thereof; coupling means on said first and second threaded means for coupling the same for rotation together in one of said control positions; rotary drive means; and transmission means connecting said drive means with said second threaded means for rotation together and for relative movement in axial direction so that when said second threaded means is rotated by said drive means, said second threaded means first moves in axial direction relative to said first threaded means for actuating said first feeding means to feed the cutter in said radial direction of the cut gear blank and upon reaching said one control position is coupled to said first threaded means for turning movement and operates through said first threaded means said second feeding means to feed said cutting tool in axial direction of the work piece.

2. In a gear hobbing machine tool, a control arrangement for moving a cutting tool first in radial direction and then in axial direction relative to a cut gear blank, the control arrangement comprising, in combination, first feeding means for feeding the tool in a first direction adapted to be radial with respect to a cut gear; second feeding means for feeding the tool in a second direction adapted to be axial with respect to the cut gear; a turnable first threaded means non-movable in axial direction and operatively connected to said second feeding means for actuating the same during turning movement thereof; a turnable second threaded means threadedly engaging said first threaded means and being movable thereon in axial direction between two control positions during relative turning movement between said first and second threaded means, said second threaded means being operatively connected to said first feeding means for actuating the same by axial movement thereof; first coupling means on said first and second threaded means for coupling the same for rotation together in one of said control positions; second coupling means on said first and second threaded means for coupling the same for rotation together in opposite direction of rotation in the other of said control positions; rotary drive means; transmission means connecting said drive means with said second threaded means for rotation together and for relative movement in axial direction so that when said second threaded means is rotated by said drive means, said second threaded means first moves in axial direction relative to said first threaded means for actuating said first feeding means to feed the cutter in said radial direction of the cut gear blank and upon reaching said one control position is coupled to said first threaded means for turning movement and operates through said first threaded means said second feeding means to feed said cutting tool in axial direction of the work piece; and means for reversing the direction of rotation of said rotary drive means after a predetermined turning movement of said drive means in one direction of rotation so as to reverse said drive means when said second feeding means have fed the tool a predetermined distance in said second direction whereby said first coupling means is disengaged and said second threaded means moves in axial direction on said first threaded means for reversing said first feeding means and the radial movement of the tool, and upon reaching said other control position is coupled by said second coupling means to said first threaded means for turning movement for operating said second feeding means in reverse direction so as to reverse the axial movement of the tool.

3. In a gear hobbing machine tool, a control arrangement for moving a cutting tool first in radial direction and then in axial direction relative to a cut gear blank, the control arrangement comprising, in combination, first means for rotating the cutting tool; second means for rotating said gear blank, differential gear means connecting said first and second means; first feeding means for feeding the tool in a first direction adapted to be radial with respect to a cut gear; second feeding means for feeding the tool in a second direction adapted to be axial with respect to a cut gear; a turnable control spindle non-movable in axial direction; first connecting means operatively connecting said control spindle to said second feeding means for actuating the same during turning movement of said control spindle; a nut means threadedly engaging said control spindle and being movable thereon in axial direction between two control positions during relative turning movement between said nut means and said control spindle; second connecting means operatively connecting said nut means to said first feeding means for actuating the same during axial movement of said nut means; coupling means on said control spindle and on said nut means for coupling said control spindle and said nut means for rotation together in one of said control positions; rotary drive means; and transmission means connecting said drive means with said nut means for rotation together and for relative movement in axial direction of said spindle so that when said nut means is rotated by said drive means, said nut means first moves in axial direction on said control spindle for actuating said first feeding means to feed the cutter in said radial direction of the cut gear blank and upon reaching said one control position is coupled to said control spindle means for turning movement and operates through said control spindle said second feeding means to feed said cutting tool in axial direction of the work piece.

4. In a gear hobbing machine tool, a control arrangement for moving a tool cutting tool first in radial direction and then in axial direction relative to a cut gear blank, the control arrangement comprising, in combination, first means for rotating the cutting tool, second means for rotating said gear blank, differential gear means connecting said first and second means, first feeding means for feeding the tool in a first direction adapted to be radial with respect to a cut gear; second feeding means for feeding the tool in a second direction adapted to be axial with respect to the cut gear; a turnable control spindle non-movable in axial direction; first connecting means operatively connecting said control spindle to said second feeding means for actuating the same during turning movement of said control spindle; a nut means threadedly engaging said control spindle and being movable thereon in axial direction between two control positions during relative turning movement between said nut means and said control spindle; second connecting means operatively connecting said nut means to said first feeding means for actuating the same during axial movement of said nut means; first coupling means on said control spindle and on said nut means for coupling said control spindle and said nut means for rotation together in one of said control positions; second coupling means on said control spindle and on said nut means for coupling the same for rotation together in opposite direction of rotation in the other of said control positions; rotary drive means; transmission means connecting said drive means with said nut means for rotation together and for relative movement in axial direction of said spindle so that when said nut means is rotated by said drive means, said nut means first moves in axial direction on said control spindle for actuating said first feeding means to feed the cutter in said radial direction of the cut gear blank and upon reaching said one control position is coupled to said control spindle means for turning movement and operates through said control spindle said second feeding means to feed said cutting tool in axial direction of the work piece; and means for reversing the direction of rotation of said rotary drive means after a predetermined turning movement of said drive means in one direction of rotation so as to reverse said drive means when said second feeding means have fed the tool a predetermined distance in said second direction whereby said first coupling means is disengaged and said nut means moves in axial direction on said control spindle for reversing said first feeding means and the radial movement of the tool, and upon reaching said other control position is coupled by said second coupling means to said control spindle for turning movement for operating said second feeding means in reverse direction so as to reverse the axial movement of the tool.

5. In a gear hobbing machine tool for cutting gears, a control arrangement for moving a cutting tool first in radial direction and then in axial direction relative to a cut gear blank, the control arrangement comprising, in combination, first feeding means for feeding the tool in a first direction adapted to be radial with respect to a cut gear; second feeding means for feeding the tool in a second direction adapted to be axial with respect to the cut gear; a turnable control spindle non-movable in axial direction; first connecting means operatively connecting said control spindle to said second feeding means for actuating the same during turning movement of said control spindle; a nut means threadedly engaging said control spindle and being movable thereon in axial direction between two control positions during relative turning movement between said nut means and said control spindle; second connecting means operatively connecting said nut means to said first feeding means for actuating the same during axial movement of said nut means; coupling means on said control spindle and on said nut means for coupling said control spindle and said nut means for rotation together in one of said control positions; rotary drive means; and transmission means connecting said drive means with said nut means for rotation together and for relative movement in axial direction of said spindle so that when said nut means is rotated by said drive means, said nut means first moves in axial direction on said control spindle for actuating said first feeding means to feed the cutter in said radial direction of the cut gear blank and upon reaching said one control position is coupled to said control spindle means for turning movement and operates through said control spindle said second feeding means to feed said cutting tool in axial direction of the work piece.

6. A control arrangement as set forth in claim 5 wherein said transmission means includes gear teeth on the outer surface of said nut means, and a drive gear meshing with said gear teeth, the axial extension of said gear teeth being substantially greater than the axial extension of said drive gear to permit relative axial movement between said nut means and said drive gear.

7. A control arrangement as set forth in claim 5 wherein said second connecting means includes a pivoted member connected to said nut means for axial movement, gear teeth on said pivoted member, a turnable sleeve formed with a cam track, gear means connecting said gear teeth with said turnable sleeve so that said sleeve is turned during axial movement of said nut means; and a cam follower means engaging said cam track and being connected to said first feeding means.

8. A control arrangement as set forth in claim 5 wherein said second coupling means includes a coupling element mounted on said control spindle adjustable in axial direction for determining said other control position.

9. In a gear hobbing machine tool for cutting gears, a control arrangement for moving a cutting tool first in radial direction and then in axial direction relative to a cut gear blank, the control arrangement comprising, in combination, first feeding means for feeding the tool in a first direction adapted to be radial with respect to a cut gear; second feeding means for feeding the tool in a second direction adapted to be axial with respect to the cut gear; a turnable control spindle non-movable in axial direction; first connecting means operatively connecting said control spindle to said second feeding means for actuating the same during turning movement of said control spindle; a nut means threadedly engaging said control spindle and being movable thereon in axial direction between two control positions during relative turning movement between said nut means and said control spindle; second connecting means operatively connecting said nut means to said first feeding means for actuating the same during axial movement of said nut means; first coupling means on said control spindle and on said nut means for coupling said control spindle and said nut means for rotation together in one of said control positions; second coupling means on said control spindle and on said nut means for coupling the same for rotation together in opposite direction of rotation in the other of said control positions; rotary drive means; transmission means connecting said drive means with said nut means for rotation together and for relative movement in axial direction of said spindle so that when said nut means is rotated by said drive means, said nut means first moves in axial direction on said control spindle for actuating said first feeding means and upon reaching said one control position is coupled to said control spindle means to feed the cutter in said radial direction of the cut gear blank for turning movement and operates through said control spindle said second feeding means; and means for reversing the direction of rotation of said rotary drive means to feed said cutting tool in axial direction of the work piece after a predetermined turning movement of said drive means in one direction of rotation so as to reverse said drive means when said second feeding means have fed the tool a predetermined distance in said second direction whereby said first coupling means is disengaged and said nut means moves in axial direction on said control spindle for reversing said first feeding means and the radial movement of the tool, and upon reaching said other control position is coupled by said second coupling means to said control spindle for turning movement for operating said second feeding means in reverse direction so as to reverse the axial movement of the tool.

10. A control arrangement as set forth in claim 9 wherein said means for reversing direction of rotation of said rotary drive means includes means for increasing the rotary speed of said drive means during rotation in reverse direction for returning the cutting tool at a higher speed to its initial position.

11. A control arrangement as set forth in claim 9 and including a control mechanism driven by said drive means and controlling said means for reversing the direction of rotation of said rotary drive means, said control mechanism including means for stopping said drive means when the cutting tool arrives in its initial position.

12. A control arrangement as set forth in claim 11 wherein said control mechanism includes a control member having an adjustable terminal position.

13. A control arrangement as set forth in claim 9 and including first means for rotating said cutting tool; second means for rotating the cut gear; and transmission means connecting said first and second means and including differential gear means, said transmission means including gear means connected to said control spindle for turning movement.

14. In a gear hobbing machine, a control arrangement for moving a cutting tool in two directions comprising, in combination, first means for rotating the cutting tool; second means for rotating said gear blank; differential gear means connecting said first and second means, first feeding means for feeding the tool in a first direction; second feeding means for feeding the tool in a second transverse direction, one of said directions being adapted to be radial with respect to a cut gear, and the other of said directions being adapted to be axial with respect to the cut gear; a first threaded means mounted turnable and non-movable in axial direction, said first threaded means being operatively connected to said second feeding means for actuating the same during turning movement thereof; a second threaded means threadedly engaging said first threaded means and being movable thereon in axial direction during turning movement thereof, said second threaded means being operatively connected to said first feeding means for actuating the same by axial movement thereof, one of said threaded means being a nut and the other of said threaded means being a threaded spindle; rotary drive means for rotating said second threaded means; and means for connecting said first and second threaded means for rotation together in a predetermined axial position of said second threaded means whereby said cutting tool is fed by said first feeding means in said first direction during axial movement of said second threaded means, and is fed by said second feeding means in said second direction during turning movement of said first threaded means driven by said drive means through said second threaded means when said second threaded means is connected for rotation to said first threaded means.

References Cited in the file of this patent

UNITED STATES PATENTS

| Re. 21,896 | Simmons | Sept. 2, 1941 |
| 606,837 | Gibson | July 5, 1898 |
| 2,008,740 | Zimmermann | July 23, 1935 |
| 2,316,367 | Schurr et al. | Apr. 13, 1943 |